H. G. BATCHELDER.
REGISTER GAGE FOR PROOF PRESSES.
APPLICATION FILED JULY 19, 1915.
1,201,238. Patented Oct. 17, 1916.
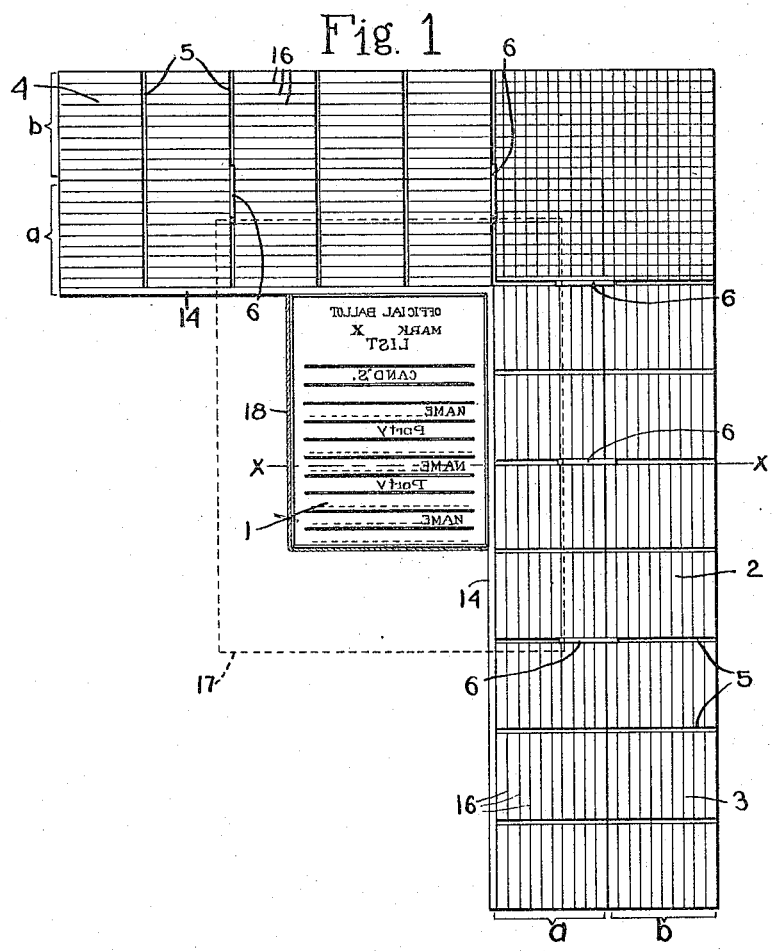
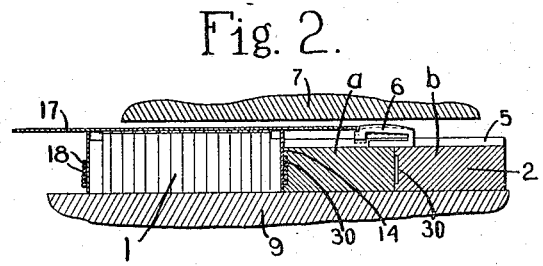
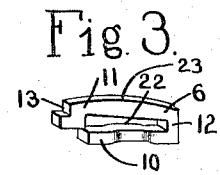
Inventor
Herbert G. Batchelder
by Heard Smith & Tennant
Att'ys

UNITED STATES PATENT OFFICE.

HERBERT G. BATCHELDER, OF WINTHROP, MASSACHUSETTS.

REGISTER-GAGE FOR PROOF-PRESSES.

1,201,238.   Specification of Letters Patent.   Patented Oct. 17, 1916.

Application filed July 19, 1915. Serial No. 40,595.

*To all whom it may concern:*

Be it known that I, HERBERT G. BATCHELDER, a citizen of the United States, residing at Winthrop, county of Suffolk, State of Massachusetts, have invented an Improvement in Register-Gages for Proof-Presses, of which the following description, in connection with the accompanying drawing, is a specification, like characters on the drawing representing like parts.

This invention has for its object to provide a novel register gage for proof presses by which the paper on which the proof is to be printed can be readily positioned while printing each one of the different colors of a proof printed in a plurality of colors so that when printed the colors will be in proper register.

Another object of the invention is to provide a device by which the paper on which the proof is to be printed may be correctly positioned to provide the proper margin.

In order to give an understanding of my invention, I have illustrated in the drawings a selected embodiment thereof which will now be described, after which the novel features will be pointed out in the appended claims.

Figure 1 of the drawings shows my improved device in operative position relative to a form or page; Fig. 2 is a section on the line x—x, Fig. 1; Fig. 3 is an enlarged view of one of the gage elements.

I have shown at 1 a "form" or "page" composed of type set up ready to be printed from. In printing from type it is customary to place the form when it has been set up on the bed of a proof-press and then to print from the form the required number of proofs. Where the proof is to be printed in a plurality of colors that are printed from different forms, it is necessary to position the paper properly when printing from each form so that when the proof is completed the colors will be in register.

My invention aims to provide a novel device by which this proper positioning of the proof can be readily secured, thus insuring that the colors of the proof will be properly in register.

The device comprises an L-shaped gage-receiving member 2 having the two legs 3 and 4 extending at right angles to each other. This gage-receiving member 2 will preferably be made of sufficient weight so that it will retain its position on the bed 9 of the proof press after it has been placed thereon. The member 2 is provided with a plurality of gage-receiving grooves 5 extending transversely of the legs 3 and 4, each leg having a plurality of such grooves therein that extend transversely thereof.

6 designates gage elements that are adapted to be received in the grooves and by which the paper on which the proof is made is properly positioned. These gage elements are constructed so that they can be adjusted longitudinally of the grooves 5 and will be frictionally held in any adjusted position and they are also constructed so that they will not interfere with the movement of the platen 7 toward the bed 9 of the proof-press during the printing operation. While these gage elements 6 may vary in construction more or less without departing from my invention, the form shown in the drawing is a practical one. This is made to present the foot portion 10 adapted to be received in one of the grooves 5 and the paper-positioning portion 11 which is connected to the foot portion 10 by the arm 12 and is provided with the positioning shoulder 13 against which the edge of the paper is placed. The device is made resilient so that the positioning portion 11 can give vertically relative to the foot portion 10.

In using the device the gage-receiving member 2 is placed on the bed 9 of the proof-press and the form or page 1 is set into the angle of the member 2, as shown in Fig. 1. It is customary to tie up the form or page 1 by means of a string 18 so as to hold the type in proper position during the printing of the proof. The inner face 14 of the gage-receiving element 2 is preferably made with the groove 30 to receive the string. After the form or page 1 is placed in position in the angle of the member 2, the gage elements 6 which occupy the grooves 5 of the legs 3 and 4 are adjusted so as to bring the positioning shoulders 13 thereof at a distance from the inner edge 14 of the legs 3 and 4 of the member 2 equal to the margin desired on the paper on which the proof is to be printed. For convenience in adjusting the gage elements, I propose to provide the legs 3 and 4 with indicating lines 16. After the gage elements have been properly positioned in the grooves 5, the paper on which the proof is to be printed is placed with two adjacent edges thereof engaging the shoulders 13 of the gage elements, as shown by dotted lines 17 in Fig. 1, and the press is then operated to print the proof in usual manner. As the platen 7 approaches the bed to press the paper against the type it engages the portions 11 of the gage elements 6, but because of the resiliency of said elements said portions 11 will yield, as shown by dotted lines Fig. 2, to permit the platen to press the paper against the type thereby to make the desired impression. When the platen is moved away from the bed, the resiliency of the gage elements 6 will cause the portions 11 thereof to rise into the full line position Fig. 2.

Where the proof is being printed in two or more different colors which are printed from different forms or pages 1 then the operation will consist in placing one form in the angle of the gage-receiving member 2 which has the gages 6 properly positioned therein and then printing in one color a proof from said form. The form may be then removed, and a form for the next color placed in position in the angle, after which the same piece of paper 17 is placed against the gage elements 6 and the next color printed. This operation is repeated for each of the colors and because the same relation exists between each of the forms 1 and the gage elements 6 after the latter are properly adjusted, the various colors of the proof will be printed in proper register.

In order to hold the gage elements in their proper position in the grooves 5 I make the foot portion 10 of each element with the offset 22 so that said foot portion will have sufficient frictional engagement with the sides of the groove 5 to hold the element in adjusted position. The friction, however, is not sufficient but what the gage element can be readily adjusted into any desired new position.

In using the device it will be placed loosely on the bed of a proof-press in proper position relative to the form 1, and it is not necessary to lock said device or the form into a frame or holder for the printing of proof, as the weight of the device is sufficient to hold it in position on the bed of the press.

I may if desired make the gage-receiving element 2 in two or more sections as indicated by the sections *a* and *b*. If a comparatively narrow margin is all that is required on the proof, then one section only need be used, but if a very wide margin is desired, then two or more sections will be used, as shown in Fig. 1, thus giving longer grooves 5 and a correspondingly greater range of adjustment of the gage element 6.

It will be noted that the gage elements are each constructed so that the end of the portion 11 in which the positioning shoulder 13 is formed overhangs or extends beyond the end of the foot portion 10. The reason for this is to provide a construction which will permit the paper to be positioned so that it will have little or no margin, for by adjusting the gage elements to the extreme inner ends of the grooves 5, the shoulders 13 can be placed so close to the edge of the form as to leave little or no margin. The portion 11 of each of the gages is made crowning slightly, as shown at 23. The purpose of this construction is so that when the platen moves toward the bed of the press it will engage said part 11 at a point above some part of the foot portion 10 thereby preventing the gage element from being tipped upwardly as would occur if the pressure came on the end of the portion 11 beyond the foot 10.

The invention is equally applicable for use in connection with those proof-presses wherein the pressure is applied to the paper by a roller or cylinder and although I have illustrated herein a selected embodiment of the invention I do not wish to be limited to the constructional features shown.

I claim:

1. In a register gage for proof presses, the combination with an L-shaped gage-receiving member which is less than type high and is adapted to embrace two sides of a "form," of a plurality of vertically-resilient gage elements adjustably sustained by said gage-receiving member and each having a paper-positioning shoulder normally situated so as to position a sheet of paper placed on the "form," the resiliency of said gage elements permitting them to yield when they are engaged by the platen as the latter and the "form" move toward each other to make the printed impression.

2. In a register gage for proof presses, the combination with a gage-receiving member which is less than type high, of a plurality of vertically-resilient gage elements adjustably sustained by said gage-receiving member and each having a paper-positioning shoulder normally situated so as to engage and position the edge of a paper placed on a "form" positioned by the gage-receiving member, the resiliency of the gage elements permitting them to yield as the platen and "form" are moved toward each other to make a printed impression.

3. In a register gage for proof presses, the combination with an L-shaped gage-receiving member which is less than type high and is adapted to embrace two sides of and thereby position a "form," said gage-receiving member having transverse grooves in the legs thereof, of a plurality of gage elements adjustably mounted in said grooves and each provided with a paper-positioning shoulder situated to engage and position the edge of a sheet of paper placed on the type.

4. In a device of the class described, the combination with an L-shaped gage-receiving member which is less than type high and which has transverse grooves in the legs thereof, of a plurality of gage elements adjustably mounted in said grooves and each provided with a paper-positioning shoulder situated above the upper face of the gage-receiving member, said gage elements being vertically resilient.

In testimony whereof, I have signed my name to this specification.

HERBERT G. BATCHELDER.

Copies of this patent may be obtained for five cents each, by addressing the "Commissioner of Patents, Washington, D. C."